(12) United States Patent
Morofke et al.

(10) Patent No.: US 7,894,046 B2
(45) Date of Patent: Feb. 22, 2011

(54) TWO-DIMENSIONAL ESTIMATION TECHNIQUE FOR DOPPLER OPTICAL COHERENCE TOMOGRAPHY (OCT)

(76) Inventors: Darren Ross Morofke, 40 Harringay Crescent, Toronto, ON (CA) M1W 1Z3; Victor Xiao Dong Tang, #22, 325 Jarvis St., Toronto, ON (CA) M5B 2C2; Michael Kolios, 94 Tollgate Drive, Ancaster, ON (CA) L9G 5E1

( * ) Notice: Subject to any disclaimer, the term of this patent is extended or adjusted under 35 U.S.C. 154(b) by 225 days.

(21) Appl. No.: 12/318,754

(22) Filed: Jan. 7, 2009

(65) Prior Publication Data

US 2009/0225301 A1 Sep. 10, 2009

Related U.S. Application Data

(60) Provisional application No. 61/006,331, filed on Jan. 7, 2008.

(51) Int. Cl.
*G01P 3/36* (2006.01)
(52) U.S. Cl. ........................................ 356/28.5; 356/28
(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS 5,178,153 A * 1/1993 Einzig ......................... 600/505

7,742,173 B2 * 6/2010 Yun et al. .................... 356/479

* cited by examiner

*Primary Examiner*—Thomas H Tarcza
*Assistant Examiner*—Luke D Ratcliffe
(74) *Attorney, Agent, or Firm*—Lynn C. Schumacher; Hill & Schumacher

(57) ABSTRACT

Optical Coherence Tomography (OCT) is a high-resolution, non-invasive technique to image subsurface tissue and tissue functions. A broadband light source illuminates an object and the reflected photons are processed using an interferometer, demodulated into inphase and quadrature components and then digitized. The captured data contains information about the velocity of the moving scatterers but current Doppler estimation algorithms have a limited velocity detection range. Using a two dimensional velocity estimation, Doppler OCT (DOCT) can be used for the detection of in vivo aortic blood flow rates of over 1 m/s peak velocity through an esophageal DOCT probe. Previous methods have used a transverse Kasai (TK) autocorrelation estimation to estimate the velocity which is good for slow velocities, such as in the microvasculature. By calculating the Kasai autocorrelation with a lag in the depth or axial direction, backscattered frequency information is obtained which yields high velocity rate information. Through subtraction with stationary backscattered information, the Doppler shift is obtained by the axial Kasai (AK) technique. Through utilizing information from two dimensions, velocities can be resolved which spans rates from the microcirculation to cardiac blood flow velocities.

16 Claims, 9 Drawing Sheets

TWO-DIMENSIONAL ESTIMATION TECHNIQUE FOR DOPPLER OPTICAL COHERENCE TOMOGRAPHY (OCT)

CROSS REFERENCE TO RELATED U.S. APPLICATIONS

This patent application relates to, and claims the priority benefit from, U.S. Provisional Patent Application Ser. No. 61/006,331 filed on Jan. 7, 2008, in English, entitled A TWO-DIMENSIONAL ESTIMATION TECHNIQUE FOR DOPPLER OPTICAL COHERENCE TOMOGRAPHY (OCT), and which is incorporated herein by reference in its entirety.

FIELD OF THE INVENTION

This invention relates to the detection of motion through noninvasive tomography. Noninvasive in vivo imaging and velocity estimation of bidirectional blood flow has been demonstrated from 7 µm/s to over 1 m/s.

BACKGROUND OF THE INVENTION

Optical Coherence Tomography (OCT) is a method for non-invasive acquisition of high-resolution images of subsurface tissue structure and function. Through the use of autocorrelation phase sensitive detection and Kasai velocity estimator Doppler frequency shifts can currently be estimated in real-time with Doppler OCT systems (DOCT) in real-time. The maximum detectable velocity is determined by the wavelength of the light, refractive index of the medium, Doppler angle, and the time between samples or a-scan frequency, which is detailed later. Given a fixed wavelength, set angle for in vivo applications, and a defined refraction index for the tissue; the sample time is the only dynamic variable. Increasing the a-scan rate is a technological challenge that is continuously being worked on, however, the sampling rate in the axial direction is orders of magnitude higher than $f_a$.

The transverse Kasai (TK) autocorrelation estimator is suitable for imaging slow bi-directional flows representative of microcirculation and is the one currently used on DOCT systems. Aliasing due to the axial scan (a-scan) frequency, however, limits the maximum TK detected non-aliased axial flow speed to <4 mm/s on time-domain OCT systems where rapid scanning optical delay (RSOD) lines operate at scan rates between 8 to 15 kHz. The upper limit can be increased to ~8 cm/s on spectral domain or swept-source OCT systems with higher effective a-scan rates.

Phase-unwrapping techniques can extend the velocity detection range; however, at high flow rates, separation between aliasing rings can become smaller than the spatial resolution of the imaging system, making phase-unwrapping unreliable. DSP-based autocorrelation with time delays less than the a-scan period and Hilbert transform techniques can provide-higher aliasing limits up to ~35 cm/s with reduced sensitivity to low flow speed. However, in applications such as coronary imaging, flow velocity estimation in the range of meters per second is required. In addition, blood flow velocity in the microvasculature of atheroma can be orders of magnitude lower than that in the lumen and both velocities can be present in the OCT field of view.

Therefore, there is a need to provide a method that addresses the above-mentioned problems. We have determined a new method for flow estimation that has been in vivo tested to flow velocities of over 1 m/s. Furthermore, because this method does not require additional hardware, it can be adapted onto older systems through a software update and give a resolvable velocity range from the um/s range to the m/s range spanning both microvasculature imaging and cardiac imaging.

SUMMARY OF THE INVENTION

To take advantage of the fast sampling rate, the present invention provides a method which uses a two dimensional (2D) approach for velocity estimation. Existing methods, such as the transverse Kasai estimation approach (TK) for Ultrasound have been applied to DOCT and are able to resolve flow rates at a microvasculature range. By applying an autocorrelation of the in-phase and quadrature components of a DOCT system in the axial direction, called an Axial Kasai (AK), the mean backscattered carrier frequency is determined as, $$f_{AK} = \frac{f_s}{2\pi}\arctan\left(\frac{\sum_{m=0}^{M-2}\sum_{n=0}^{N-1}\left[\begin{array}{c}Q(m,n)I(m+1,n)-\\I(m,n)Q(m+1,n)\end{array}\right]}{\sum_{m=0}^{M-2}\sum_{n=0}^{N-1}\left[\begin{array}{c}I(m,n)I(m+1,n)+\\Q(m,n)Q(m+1,n)\end{array}\right]}\right),$$

where $f_{AK}$ is the estimated mean backscatter frequency and $f_s$ is the sampling rate. If the carrier frequency determined by this formula is compared between moving and non-moving time segments the doppler frequency can be determined as, $$f_d \approx f_{AK\,moving} - f_{AK\,stationary},$$

where $f_D$ is the Doppler shift as a result of a difference in $f_{AK}$ between the moving and stationary scatterer. The Doppler shift determined through the AK can then be used to determine the velocity of the scattering object.

Thus, an embodiment of the present invention provides a method for tomographic imaging for estimating flow velocity of a sample volume, comprising:

providing a source of at least partially coherent optical radiation through an interferometer;

splitting said source in said interferometer into a first optical path for a reference arm and a second optical path for emission onto said fluid flow sample;

phase modulating said radiation in said interferometer at a modulation frequency;

continuously scanning a fluid flow sample with said source of at least partially coherent optical radiation through said interferometer, said fluid flow sample having a fluid flow therein and a structure in which said fluid flow is defined;

detecting backscattered radiation received by said interferometer from said sample to detect interference fringes within said interferometer;

demodulating the detected backscattered radiation into inphase and quadrature components corresponding to said interference fringes;

processing said inphase and quadrature signals corresponding to said interference fringes established by said backscattered radiation in said interferometer to generate a tomographic structural image;

processing said inphase and quadrature signals corresponding to said interference fringes established by said backscattered radiation in said interferometer using an autocorrelation based method to obtain the mean backscattered frequency;

processing said backscattered frequencies to generate image showing velocity information; and processing said velocity image and said tomographic structural image to generate a combined image and displaying said combined image.

In another aspect of the present invention there is provided an apparatus for optical Doppler tomographic imaging of fluid flow velocity in highly scattering medium, comprising:

a source of at least partially coherent optical radiation;

an interferometer coupled to said source of radiation, said interferometer having a reference arm for a reference beam and a sample arm for a sample beam;

a scanner coupled to said interferometer for scanning a fluid flow sample with said sample beam of said interferometer;

a sensor coupled to said interferometer for detecting backscattered radiation received by said interferometer from said scanner to detect interference fringes within said interferometer; and signal demodulation means coupled to said sensor for generation of inphase and quadrature components corresponding to said interference fringes; and data processor coupled to said demodulation means for processing said inphase and quadrature signals corresponding to said interference fringes established by said backscattered radiation in said interferometer for controlling said scanner to generate tomographic images, wherein said data processor is configured to generate a tomographic structural image and a flow velocity image through an autocorrelation based method for estimation of mean backscattered frequency, and processing said velocity image and said tomographic structural image to generate a combined image; and display means for displaying said combined image.

A further understanding of the functional and advantageous aspects of the invention can be realized by reference to the following detailed description and drawings.

BRIEF DESCRIPTION OF THE DRAWINGS

Embodiments of the present invention will now be described, by way of example only, with reference to the attached figures in which.

DETAILED DESCRIPTION OF THE INVENTION

Figure 1:
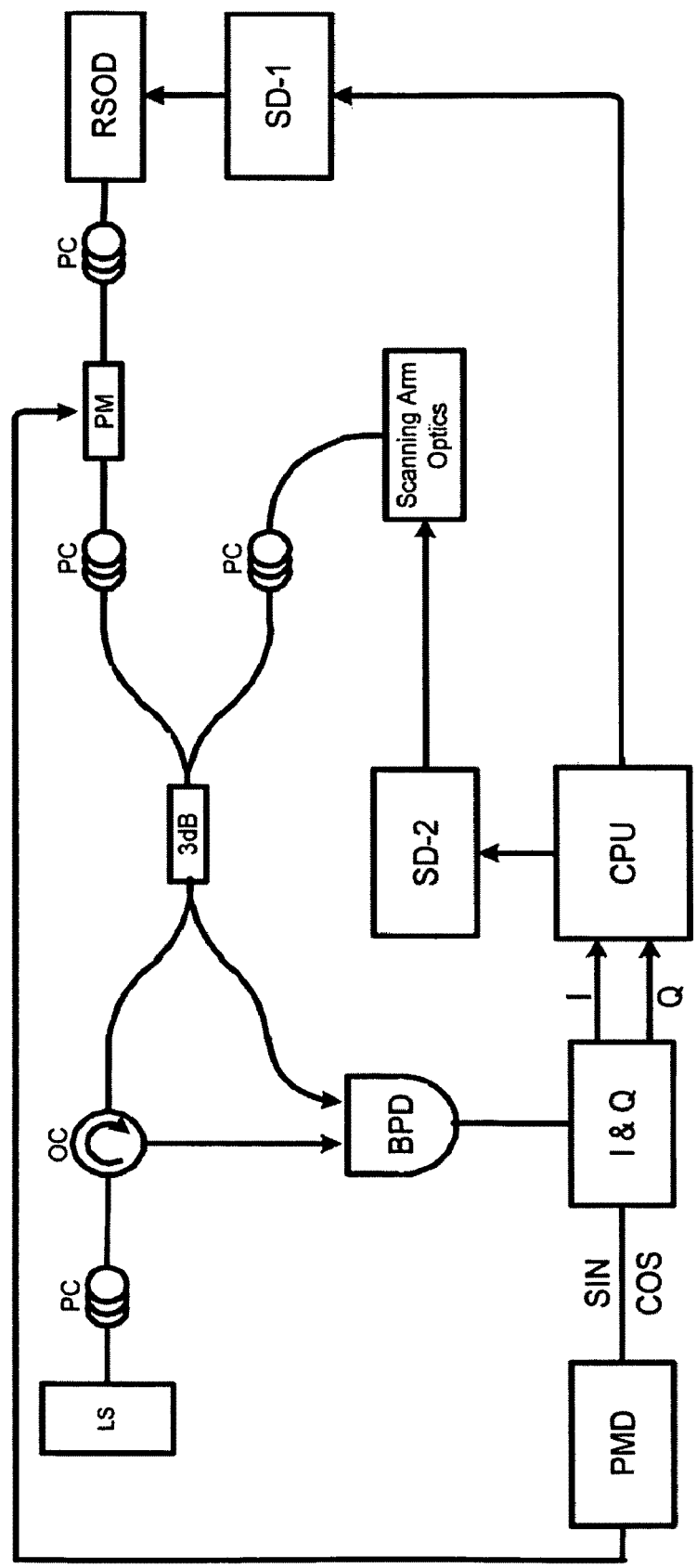
FIG. 1: Block diagram of a time domain OCT setup used. LS: light source; PC: polarization controller; OC: optical circulator; 3 dB: 50-50 fiber coupler; PM: phase modulator; RSOD: rapid scanning optical delay line; BPD: balanced photo-detector; PMD: phase modulator driver; I&Q: in-phase and quadrature demodulator; SD-1 & 2: scanner drivers; COMP: computer.

Generally speaking, the systems described herein are directed to methods and apparatus for Doppler optical coherence tomography (OCT) particularly for imaging inside the body. As required, embodiments of the present invention are disclosed herein. However, the disclosed embodiments are merely exemplary, and it should be understood that the invention may be embodied in many various and alternative forms.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to method and apparatus for Doppler optical coherence tomography (OCT).

As used herein, the term "about", when used in conjunction with ranges of dimensions, temperatures or other chemical or physical properties or characteristics is meant to cover slight variations that may exist in the upper and lower limits of the ranges so as to not exclude embodiments where on average most of the dimensions, temperatures, or any other chemical or physical properties or characteristics are satisfied but where statistically they may exist outside this range.

Optical Coherence Tomography (OCT) is a high-resolution, non-invasive technique to image subsurface tissue and tissue functions. A broadband light source is modulated with a carrier frequency and through a difference in optical path lengths, interferometery can be used to resolve depth dependant scatterers. It is common to use a Michelson interferometery in OCT. Light is split in two parts by passing the light through a beam splitter where the first optical path goes to a reference arm and second is emitted through an optical fiber probe. Light reflected back from a scattering object and from a mirror in the reference arm are recombined at a detector wherein the differences in their optical path length create an interference pattern proportional to the reflectivity of the scattering object. When low-coherent broadband light is used, the backscattered photons will have only a small coherence length, or optical path length, in which they can constructively or destructively interfere and form said interference pattern. By utilizing this, the path length in the reference arm can be changed by linearly moving the reference mirror in thereby changing the depth of the detected interference pattern.

To increase the scanning speed, a Fourier based Rapid Scanning Optical Delay (RSOD) was implemented. According to the Fourier transform, if a phase ramp is imparted in the spectral domain, there will be a corresponding spatial delay created in the time domain. By reflecting non-coherent light off of a diffraction grating, it is separated into its different frequency components. This is analogous to the transform of the spatial domain into the spectral domain. The separated light is reflected through a convex lens towards an oscillating mirror, which oscillates on a fixed pivot point through a very small angle. This change in angle imparts a phase ramp to the incoming light components. The shifted spectral components are reflected through the lens and onto the grating to recombine before reflecting off of a double pass mirror. The double pass mirror the returns the light back through the same path and into the fiber optic cable towards the interferometer. The returned light contains the time domain shift induced by the spectral phase ramp corresponding to a change in depth into the sample. The scanning rate of this systems' RSOD is 8 kHz and a schematic can be seen in FIG. 7.

The interference pattern is captured by a balanced photo detector and then through comparison to reference orthogonal sinusoid waves and is broken into in-phase and quadrature demodulate signals by, $$\Gamma(t) = I(t) + jQ(t),$$

where $\Gamma$ is the signal and I and Q are the instantaneous in-phase and quadrature components. This patent deals with using these signals to generate velocity information to estimate the Doppler shift of the mean carrier frequency.

A Doppler shift is defined as change in frequency due to the relative difference in velocities between a receiver and a transmitter. When applied to a moving scatterer and stationary transceiver, the backscattered Doppler shift is represented mathematically as, $$f_D = \frac{2 v_o n_t}{\lambda_o} \cos\theta,$$

where $f_D$ is the backscattered Doppler shift, $v_o$ is the velocity of the scatterer, $\lambda$ is the wavelength, $n_t$ is the index of refraction of the medium, and $\theta$ is the Doppler angle.

There are several techniques for estimation of the frequency shift caused by the motion of the backscattered light on optical coherence tomography (OCT) systems. The Kasai method is a phase based velocity estimation technique applied in the transverse direction, perpendicular to the direction of the laser, to in-phase and quadrature demodulated OCT data. By using the I and Q components, the phase can be calculated using a four-quadrant arctangent function where, $$\phi(t) = \arctan\left(\frac{Q(t)}{I(t)}\right),$$

which determines the phase at any given point with a range of $-\pi$ to $\pi$. To determine the phase shift over a given time interval, the discretized derivative of the phase is taken, $$\frac{d\phi(t)}{dt} \approx \frac{\Delta\phi(t)}{\Delta i} = \frac{Q(i)I(i-1) - I(i)Q(i-1)}{Q^2(i) + I^2(i)},$$

where i is the index number of the digital sample. This phase estimation can be converted to frequency through, $$\Delta f = \frac{1}{2\pi T_s} \Delta \Phi,$$

where $\Delta f$ is the change in frequency, $T_s$ is the time between two samples and $\Delta\Phi$ is the change in phase over time. To determine the change in phase, a transverse autocorrelation method was proposed by Kasai where, $$f_{TK} = \frac{f_a}{2\pi} \arctan\left(\frac{\sum_{m=0}^{M-1}\sum_{n=0}^{N-2}\left[\begin{array}{c}Q(m,n)I(m,n+1) - \\ I(m,n)Q(m,n+1)\end{array}\right]}{\sum_{m=0}^{M-1}\sum_{n=0}^{N-2}\left[\begin{array}{c}I(m,n)I(m,n+1) + \\ Q(m,n)Q(m,n+1)\end{array}\right]}\right),$$

where $f_a$ is the axial scanning frequency and m and n are the axial and transverse indices of the in-phase and quadrature signals and M and N are the axial and transverse length used for signal averaging. The resulting frequency is used to estimate the velocity of the scatterer and is only useful for motion occurring at the microvasculature level. A Nyquist limit gives a maximum estimated Doppler frequency of $\pm f_a/2$, or 4 kHz on the system used for experimentation.

The backscattered frequency in OCT systems have also previously been determined using the short-time fast Fourier Transform (STFFT), which are not suitable for use in real-time systems. However, by performing an autocorrelation in the axial direction, it becomes possible to resolve the mean backscattered frequency in real-time. To differentiate the two methods, the transverse method is hereon defined as the transverse Kasai (TK) while our new axial autocorrelation method is called the Axial Kasai (AK). The AK estimation for the mean backscattered frequency is, $$f_{AK} = \frac{f_s}{2\pi} \arctan\left(\frac{\sum_{m=0}^{M-2}\sum_{n=0}^{N-1}\left[\begin{array}{c}Q(m,n)I(m+1,n) - \\ I(m,n)Q(m+1,n)\end{array}\right]}{\sum_{m=0}^{M-2}\sum_{n=0}^{N-1}\left[\begin{array}{c}I(m,n)I(m+1,n) + \\ Q(m,n)Q(m+1,n)\end{array}\right]}\right),$$

where $f_s$ is the sampling frequency in the axial direction. The theoretical frequency limits on the frequency detection of this method are $\pm f_a/2$ which was equal to 5 MHz on our test system. As the AK estimates the mean backscattered carrier frequency, the Doppler shift can be acquired through the subtraction of a stationary background signal. Thus, the Doppler frequency can be calculated by, $$f_d \approx f_{AK\,moving} - f_{AK\,stationary},$$

where $f_{AKmoving}$ is the AK result for the moving scatterer and $f_{AKstationary}$ is the AK result for the stationary AK estimate. It is important to note that the TK was able to detect a change in the axial scanning rate which can be used to approximate the Doppler shift while the AK requires a background subtract in order to estimate the Doppler shift. While the AK has superior high-speed resolution capabilities, it lacks the micron/s level accuracy of the TK.

U.S. Pat. No. 5,991,697 issued to Nelson et al. (which is incorporated herein in its entirety by reference, discloses a method and apparatus using a conventional velocity estimation method for Doppler optical coherence tomography (OCT), and the apparatus disclosed therein may be used in the present method, with the exception that the data is inphase and quadurature demodulated and the computer processor in the present application is configured to process the data using a modified version of the transverse Kasai algorithm from U.S. Pat. No. 5,386,830 issued to J. E. Powers and T. Loupas, incorporated herein in its entirety, as well as a new axial Kasai (AK) axial autocorrelation method disclosed herein. The AK method disclosed herein differs from the previous TK method in by its ability to detect a shift in the mean backscattered frequency and through a subtraction of a stationary reference signal it is able to detect the Doppler shift imposed by the object which backscatters the emitted light.

An exemplary embodiment of an apparatus that may be used in for the present invention is disclosed in U.S. Pat. No. 7,242,844, issued to Yang et al (which is incorporated herein by reference in its entirety) but with the processor configured to implement the new AK method, but it will appreciated by those skilled in the art that the present invention is applicable on all time-domain OCT systems and not restricted per se to the system disclosed in Yang et al.

A block diagram of this time domain OCT system can be seen in FIG. 1. LS represents a light source which is a source of at least partially coherent optical radiation; PC represents a polarization controller; OC is an optical circulator; 3 dB represents a 50-50 fiber coupler; PM is a phase modulator; RSOD is a rapid scanning optical delay line; BPD is a balanced photo-detector; PMD represents a phase modulator driver; I and Q are an in-phase and quadrature demodulator respectively; SD-1 and 2 represent scanner drivers; and COMP is a computer containing a microprocessor configured to be programmed to implement the present method of data analysis disclosed herein.

An embodiment of the apparatus includes OCT systems with variable power output whereby the intensity of the laser if varied in order to obtain a greater depth penetration. Care must be taken when choosing laser output as high power can cause damage to the region being scanned. Another embodiment of the apparatus includes inclusion into catheters wherein the OCT probe is place into a catheter and inserted into a subject. In this embodiment, the optical fiber can be coupled through a lens and a right angle prism used to image the esophagus. Another embodiment of the apparatus includes redesigning the single mode fiber, or multiple single mode fibers, through a change in diameter or through the use of optical waveguide wafers instead of single mode fibers.

A flow phantom experiment was performed using an infusion pump with calibrated flow rate control and 1% Intralipid fluid pumped through a glass capillary of 0.5 mm inner diameter at a Doppler angle of $\theta=59°$. Images were acquired using a time-domain DOCT system containing a 5 mW broadband light source centered at 1.3 µm with a 63 nm bandwidth. The axial scanning rate was 8 kHz, using a rapid scanning optical delay (RSOD) line in the reference arm with a stable carrier frequency of 4.3 MHz. The hardware demodulated I and Q signals were processed using the TK and AK for window sizes ranging from N=2 to 32 and M=16 to 32.

Figure 7:
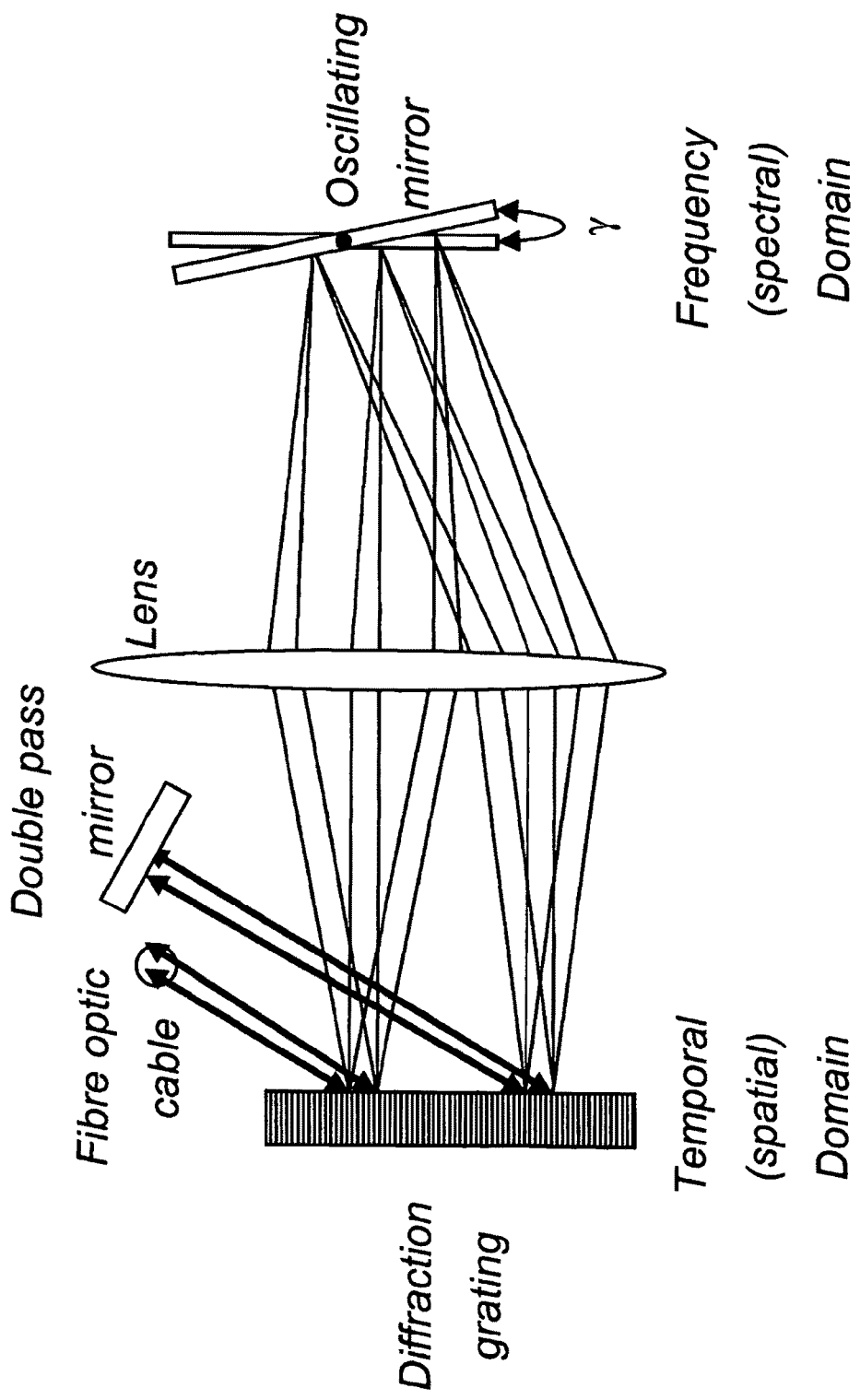
FIG. 7: Diagram demonstrating the application of a Fourier domain Rapid Scanning Optical Delay Line (RSOD) applied for use in a time-domain Optical Coherence Tomography system.

As seen in FIG. 7, the laser light is separated into its frequency components and reflected through a convex lens towards an oscillating mirror, which oscillates on a fixed pivot point through a very small angle. This change in angle imparts a phase ramp to the incoming light components. The shifted spectral components are reflected through the lens and onto the grating to recombine before reflecting off of a double pass mirror. The double pass mirror the returns the light back through the same path and into the fiber optic cable towards the interferometer. The returned light contains the time domain shift induced by the spectral phase ramp corresponding to a change in depth into the sample.

Figure 6:
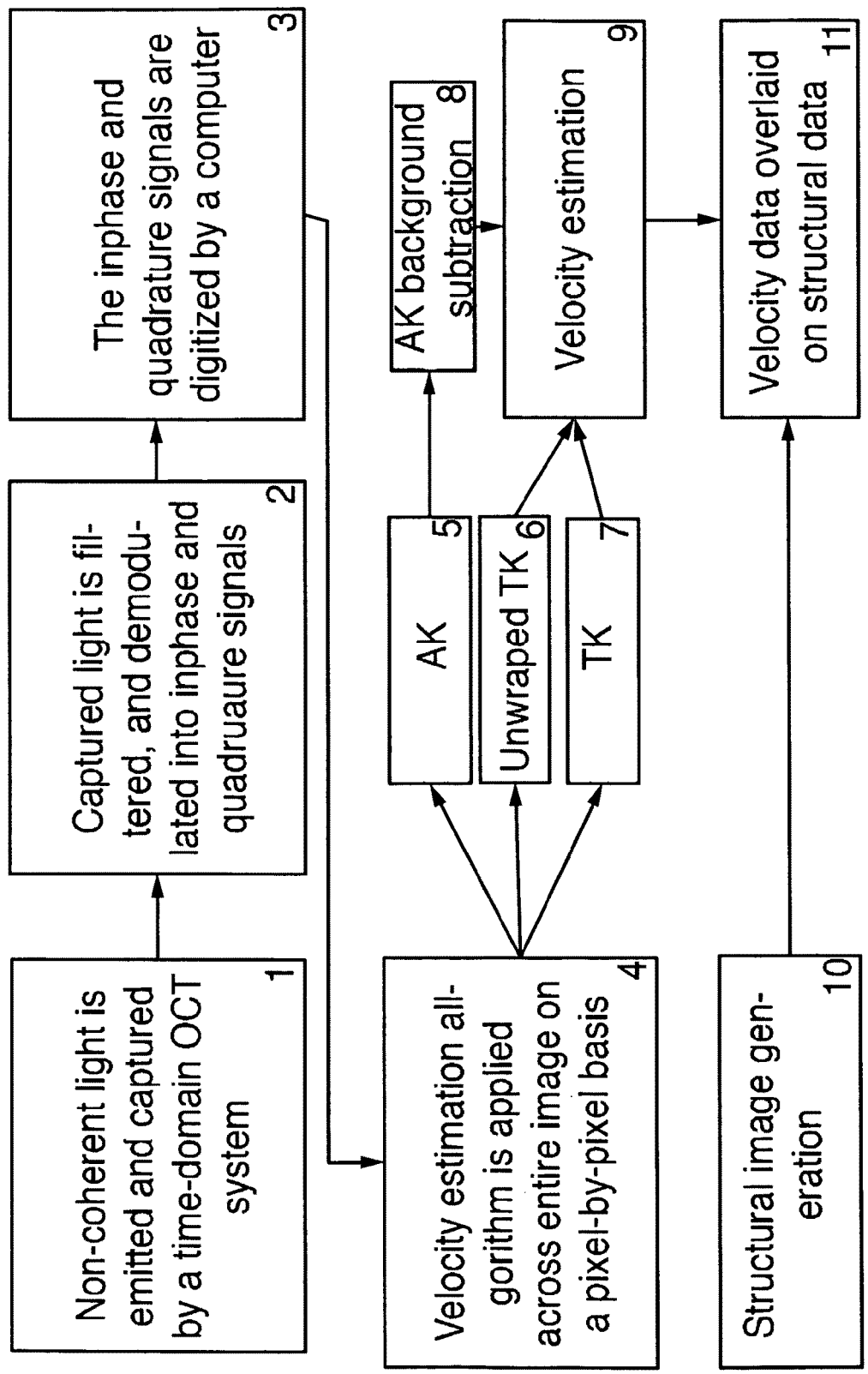
FIG. 6: A block diagram highlighting the steps used to perform a three zone velocity estimation.

Referring to FIG. 6, the method of the present invention uses a time-domain OCT systems with a phase sensitive demodulation process as highlighted in steps 1 through 3. In step 4, software is used to analyze the signal to determine the correct velocity estimation technique: either the AK, TK or TK with phase unwrapping. Should the object that backscattered the light have a velocity sufficiently high, Step 5 and 8 will be taken for the Doppler Frequency estimation otherwise Step 6 or 7 would be used. Steps 5 and 8 outline the process used by the Axial Kasai algorithm to accurately estimate, after a stationary background subtraction, the Doppler shift that occurred due to the motion of the scattering object. Steps 9 to 11 is the overlay of the velocity information on top of the structural information and is common in many medical imaging applications.

Transverse Kasai variance (TKV) processing, which computed the variance of the estimated mean Doppler shift, provided segmentation between flow and no-flow regions, similar to standard deviation Doppler imaging. Stationary background AK phase change was then subtracted for AK flow visualization. The fastest experimentally achievable peak flow velocity was 2 m/s, which had a Reynolds number of 730. The entrance length was calculated as 13 mm, which was shorter than the length of the capillary tube which was used. Laminar parabolic flow was thus assumed for all flow rates in this experiment.

Figure 2A:
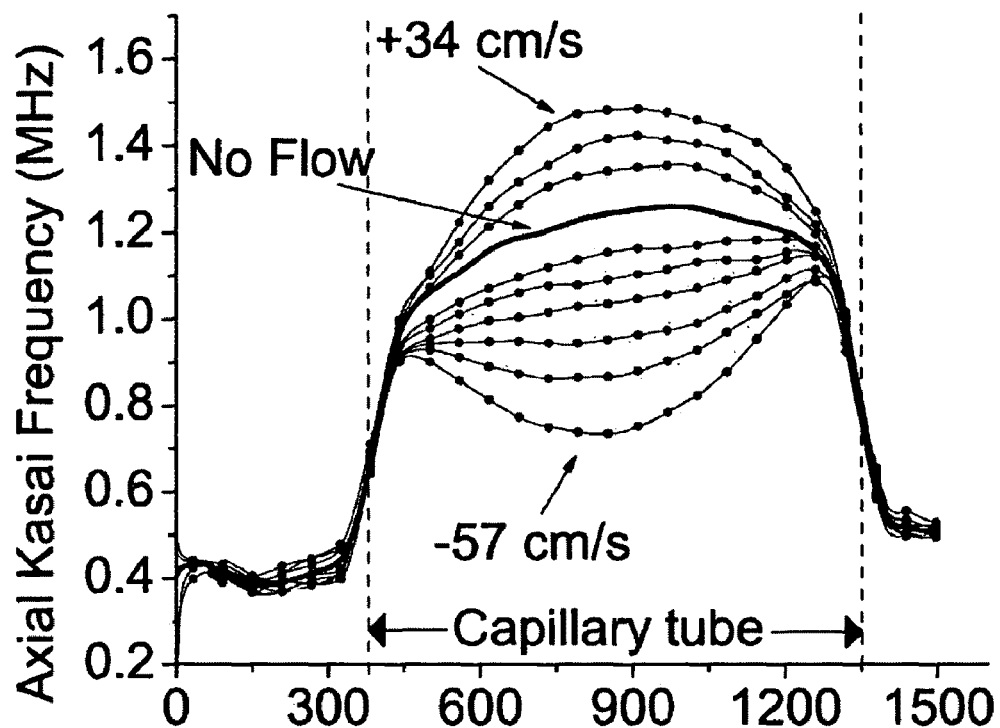
FIG. 2: (A) Change in the AK estimated frequency as a function of scatterer velocity. When no-flow AK (solid line) result subtracted from the flowing channels, a family of parabolic shapes is obtained (B); Positively labeled velocities indicate flow towards the detector, negative velocities are away. Peak scatterer velocities are +34, +20, +11, no flow, −11, −19, −25, −34, −43 and −57 cm/s from top to bottom.
Figure 2B:
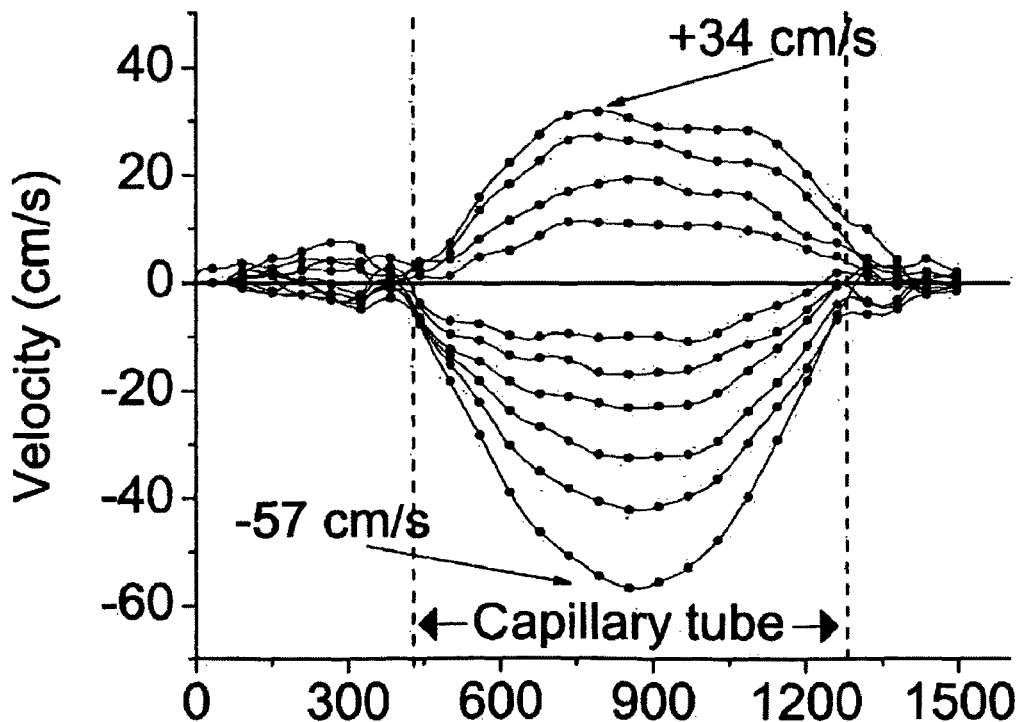
Figure 3A:
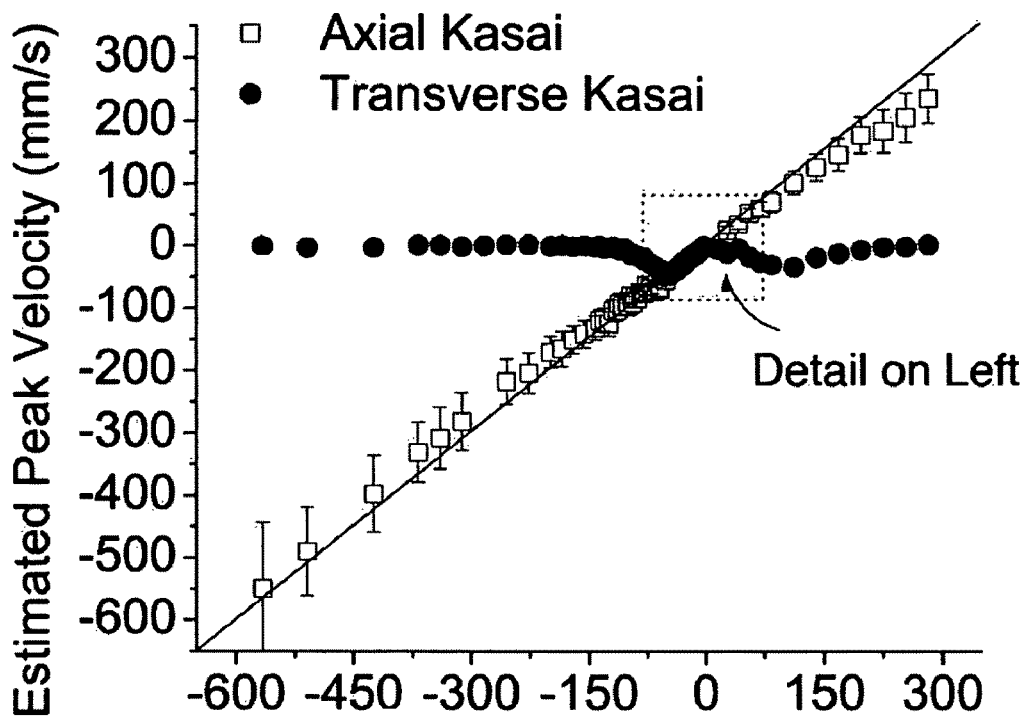
FIG. 3: TK and AK estimated peak velocities are compared to experimental peak velocities. (A) Peak velocities derived from TK and AK algorithms recorded over a large range of velocities. (B) A detailed view of TK shifts for lower flows. Error bars are result of standard error. The solid line is the line of identity.
Figure 3B:
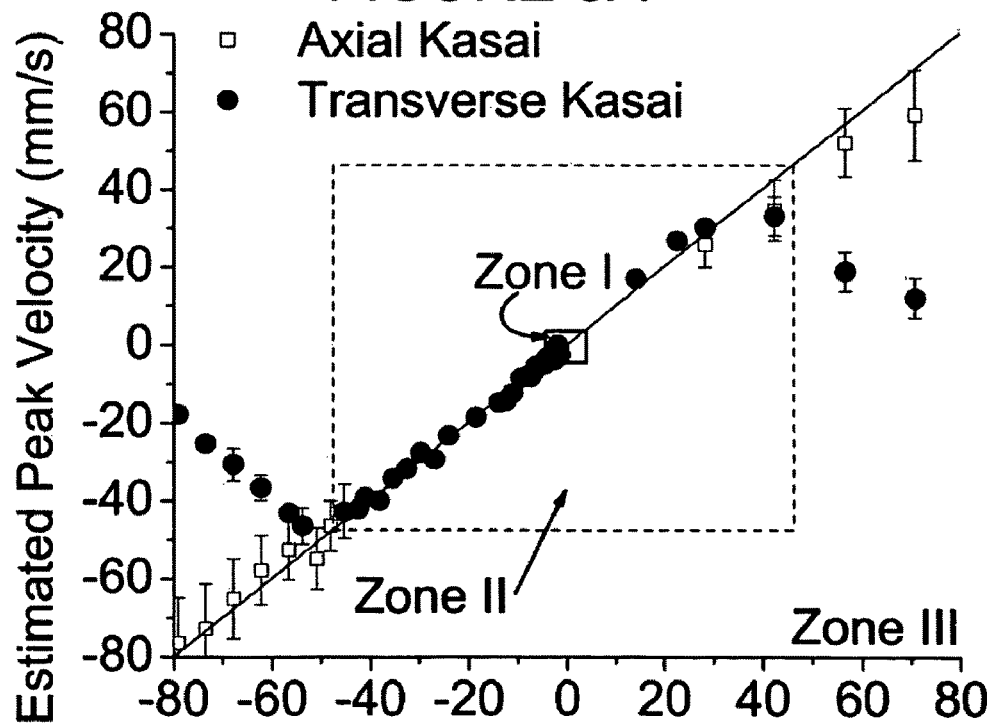

Different flow speeds were analyzed, and the AK frequency results were shown in FIG. 2A. Bi-directional velocity could be obtained by subtraction of the stationary signal from that of the moving signal and the results are shown in FIG. 2B. The estimated peak velocities from the AK and TK (mean and standard deviation over 1000 lines) were plotted in FIG. 3 for different flow rates, which showed good agreement between the measured and expected velocities. We separated the flow regimes into Zone I, with velocities estimated by TK; Zone II, where the spatial dimension of the aliasing rings are larger than the spatial resolution of the system and phase unwrapping can be reliably applied; and Zone III, with velocities estimated by AK.

Figure 4:
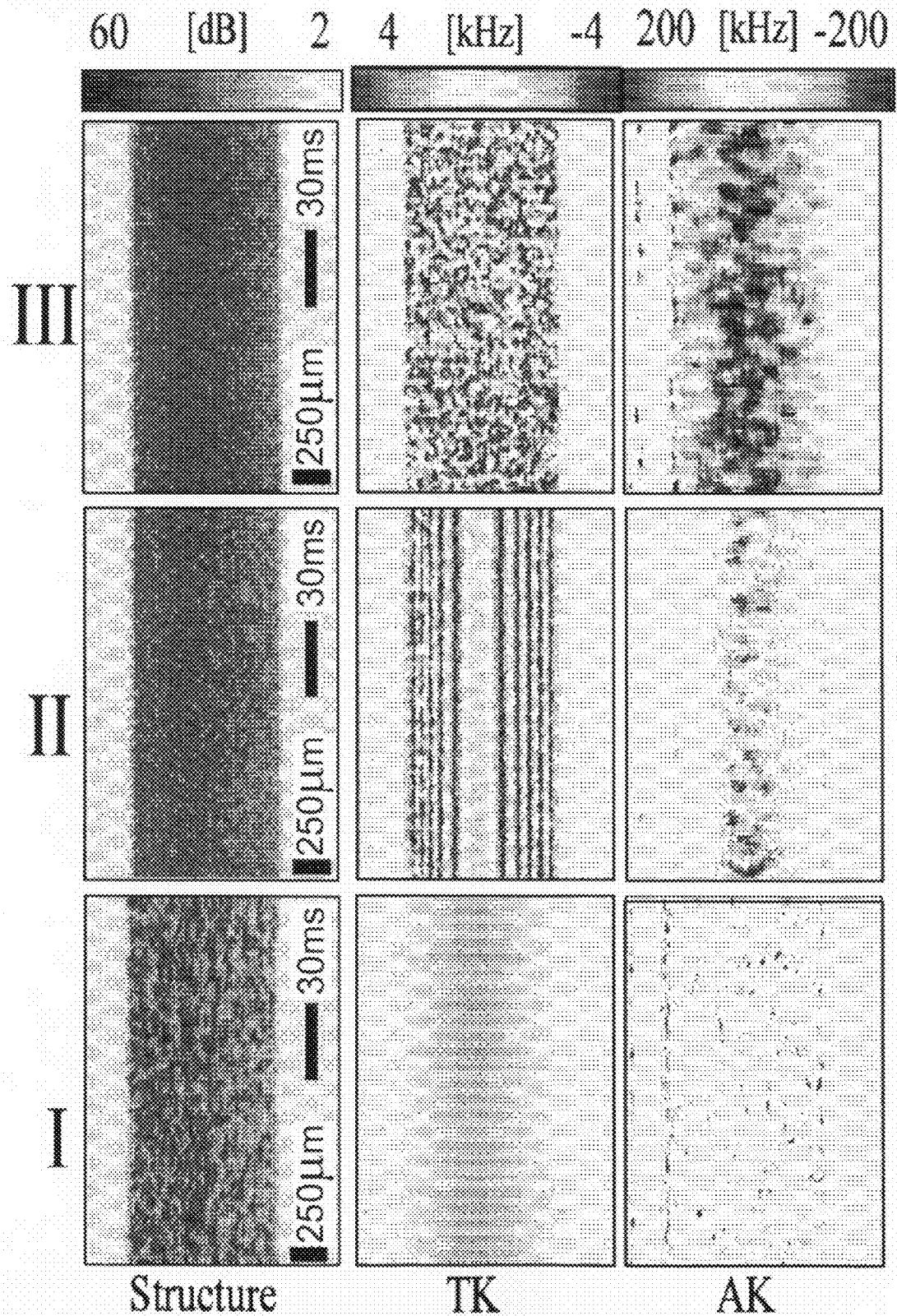
FIG. 4: M-mode images of the three detection zones showing structural, TK and AK color-maps after flow segmentation. In (I), TK accurately measures velocity, and the aliasing rings in (II) can be unwrapped reliably. In (III), the aliasing rings cannot be accurately unwrapped. The AK is able to accurately measure flow in (III), but not in (I) and (II). Aggregation of intralipid produced artifacts in the color-maps, especially at low shear rate regions.

In Zones I and II, the TK exhibited better velocity resolution than AK. Beyond them, the phase unwrapped TK underestimated the true velocities, where the AK was still able to estimate velocities with good agreement with set flow rates. Hence, it is possible to use a 2D estimator (TK and AK) to accurately measure velocity across a wide range of, spanning the µm/s to cm/s range (7 µm/s to +57 cm/s for the data shown in FIG. 3), which is over 100 dB. FIG. 4 shows structural, TK and AK M-mode images generated with peak velocities of 1.2 mm/s (4-I), 42 mm/s (4-II), and 155 mm/s (4-III) using a window size of N=M=32. In (4-I), the TK shows a parabolic profile; in (4-II), defined aliasing rings are evident that phase unwrapping can be readily applied too. In (4-III), the aliasing rings occurring with the TK are smaller than the axial resolution and the TKV approaches the axial scanning rate, so phase unwrapping cannot be reliably performed and the velocity estimation relies on AK.

Figure 5A:
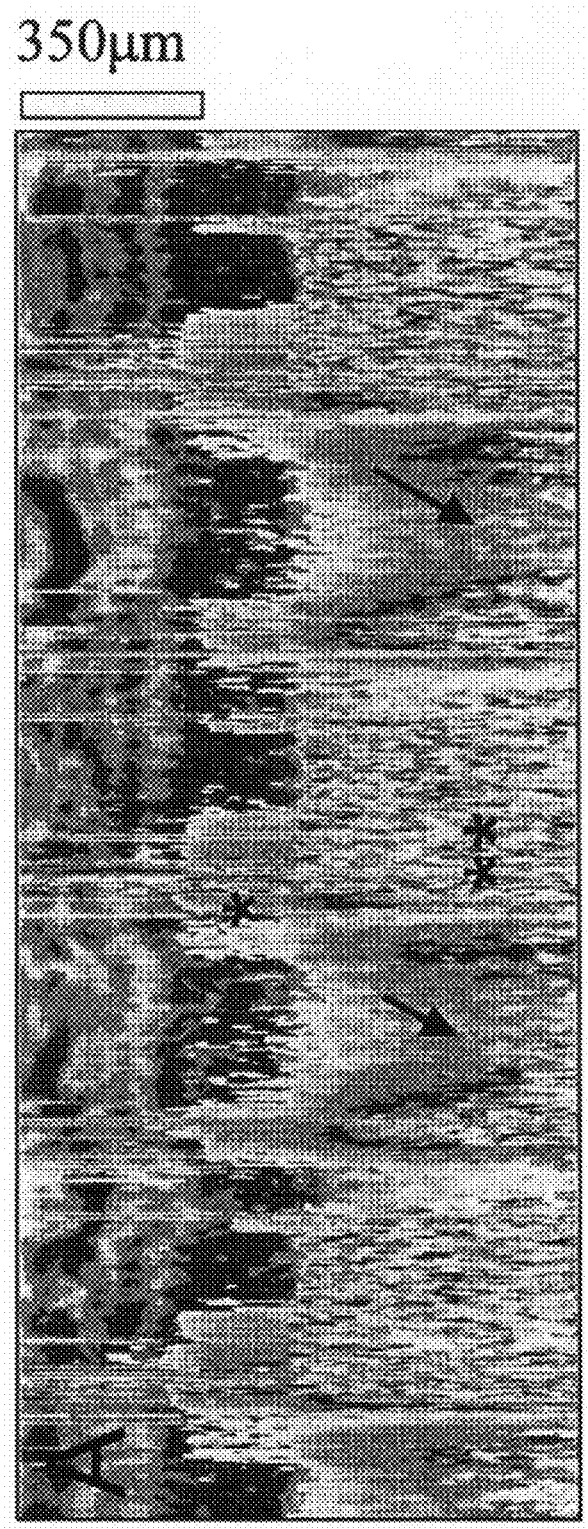
FIG. 5: In vivo images of trans-esophageal Doppler OCT of rat aortic blood flow. (A) TK results overlaid on structural image. Doppler signals indicate aortic wall motion (*), systolic rush of high-speed blood flow (**), and regions of slow flow between heart beats (white arrows). (B) AK results overlaid on the same structural image, with the esophagus and aortic wall labeled. High speed systolic flow regions consistent with large Doppler frequency shifts are clearly visualized. The temporal flow profiles measured at the dotted lines of corresponding colors in (B) are plotted in (C).

In vivo trans-esophageal M-mode images of a rat aorta were analyzed using the AK and TK algorithms. Experiments were performed using an endoscopic catheter on male Fischer rats. The average body weight was ~180 grams and they were anesthetized with 80 mg/kg of ketamine and 13 mg/kg of xylazine intramuscularly. During the procedure, the body temperature was monitored and controlled with a heating pad. These procedures were performed in accordance with an institutionally approved animal utilization protocol. The endoscopic DOCT (EDOCT) setup placed the OCT probe into a catheter. Motion artifacts were removed by a-scan alignment using the aortic wall to blood interface. FIG. 5A shows the structural image with the overlaid TK estimated Doppler frequency, while in FIG. 5B, the same structural image is overlaid with the AK results after background frequency subtraction. We measured the rat heart rate to be 230 beats per min or 0.26 s per beat. A temporal smoothing filter set at 0.025 s in length (<10% of the cardiac cycle), was used to improve the SNR while still preserving the temporal resolution and allowing visualization of the cardiac cycle. The Doppler angle was approximately 82°. The peak systolic velocity through the aorta was estimated to be ~1 m/s (FIG. 5C), in good agreement with literature.

Figure 5B:
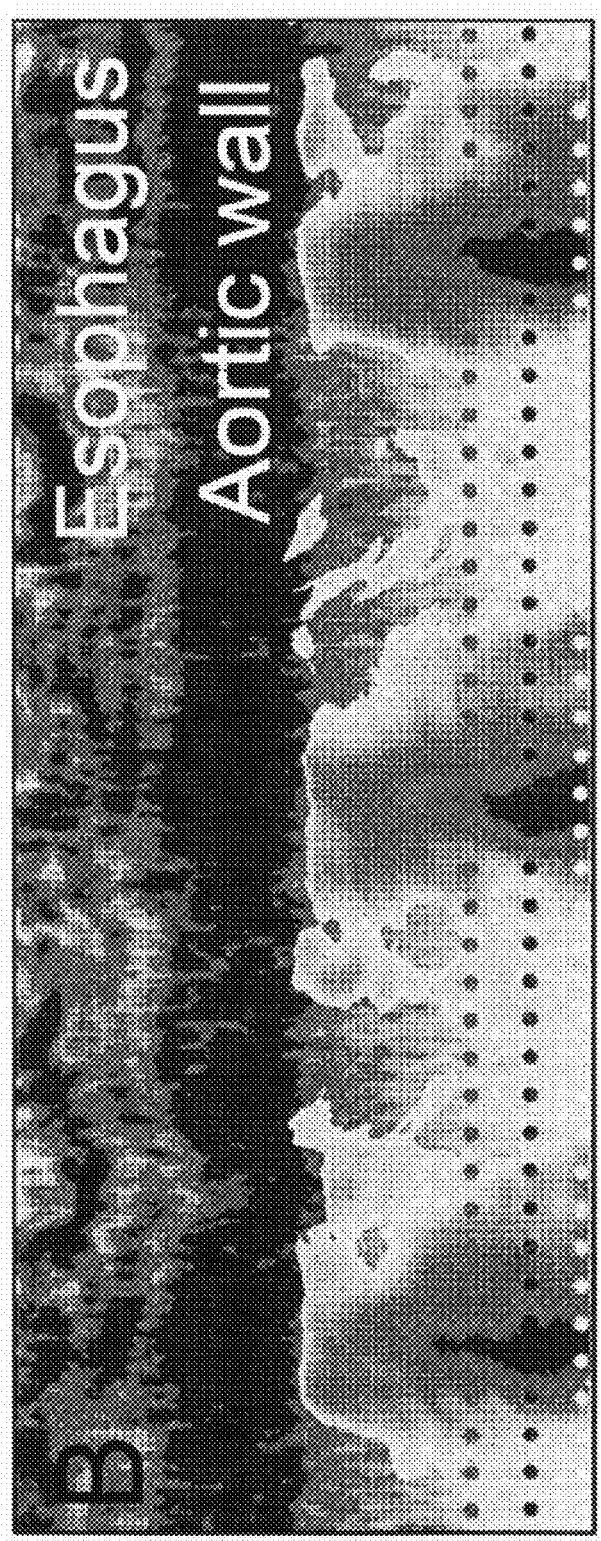
Figure 5C:
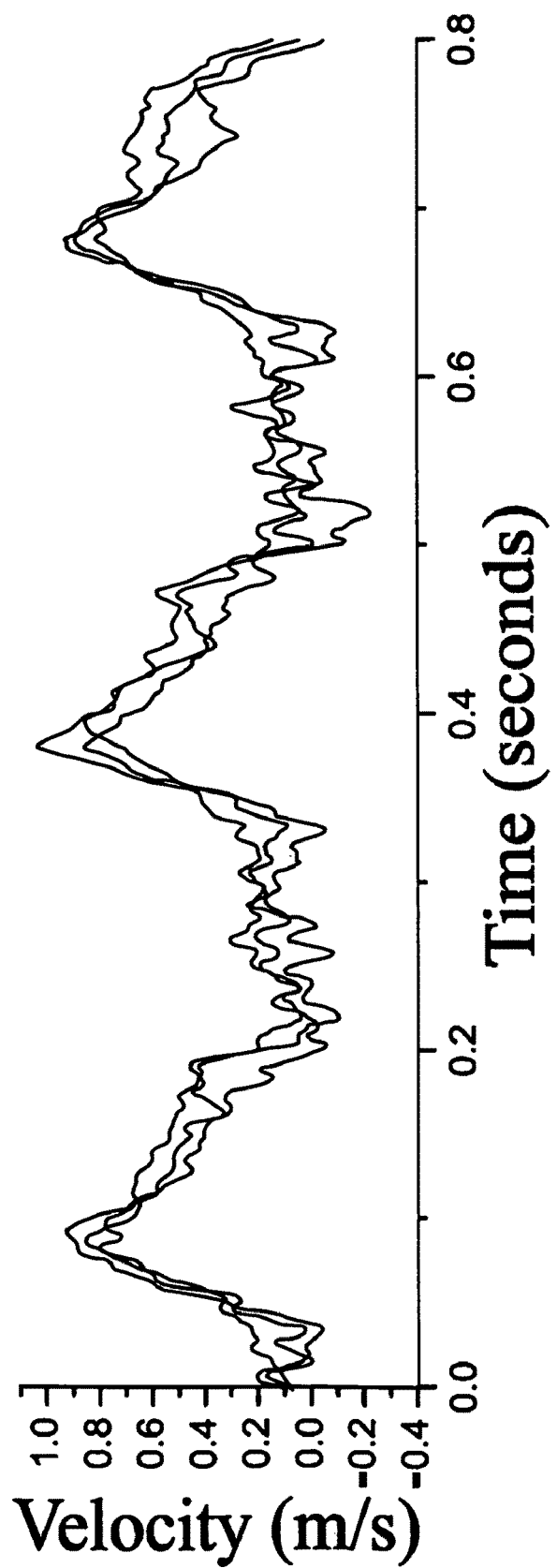

Comparing FIGS. 5A and 5B, it is evident that the TK is sensitive to a slower flow, detecting the pulsating motion of the aortic wall (velocity <2 mm/s), while the AK is capable of estimating high flow velocities (>1 m/s) without aliasing. We are exploring the use of TKV to aid merging of the TK and AK results to yield a single wide dynamic range velocity image.

The physical limiting factor in the maximum detectable Doppler shift using AK in our current system is the bandwidth of the hardware demodulation circuit, which is +/−1.6 MHz (−3 dB point). Since this is much smaller than the sampling frequency of the system, the AK velocity estimator does not experience aliasing before the OCT signal diminishes. This corresponds to a maximum-detectable velocity limit of +0.78 m/s in the axial direction (+5.6 m/s at 82° with our endoscopic catheter), which can be further increased by widening the demodulation bandwidth, with a trade-off in signal to noise ratio of the OCT signal.

The computational complexity of AK is on the same order as TK, and can be implemented for real-time operation in software. Comparing to previous autocorrelation methods, the Kasai estimation output is linear with the flow velocity. We note that misalignments in the RSOD, wavelength dependent scattering and absorption, and nonlinearities in the demodulation process contributed to the background AK phase changes, which need to be subtracted for visualizing the true flow induced phase changes. Fortunately, the TK and TKV processed from the same data set are sensitive to slow flow conditions, and the results can serve as segmentation maps for distinguishing stationary vs flow regions in subsequent AK calculations.

The AK is a substantial improvement over existing velocity estimation methods because it can accurately resolve high-speed velocities though a computationally efficiently algorithm without the need for any phase unwrapping. Furthermore, the AK can be implemented on all existing phase sensitive DOCT systems though a software update and does not require the addition of any new hardware and can be computed on archived raw inphase and quadrature data. Though a combined approach with the TK, OCT can now be used to detect motion from a scattering object spanning a range of over 100 dB.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

We claim:

1. A method for tomographic imaging for estimating flow velocity of a fluid flow sample, comprising:
   providing a source of at least partially coherent optical radiation through an interferometer;
   splitting said source in said interferometer into a first optical path for a reference arm and a second optical path for emission onto said fluid flow sample;
   phase modulating said radiation in said interferometer at a modulation frequency;
   continuously scanning a fluid flow sample with said source of at least partially coherent optical radiation through said interferometer, said fluid flow sample having a fluid flow therein and a structure in which said fluid flow is defined;
   detecting backscattered radiation received by said interferometer from said sample to detect interference fringes within said interferometer;
   demodulating the detected backscattered radiation into inphase and quadrature components corresponding to said interference fringes;
   processing said inphase and quadrature signals corresponding to said interference fringes established by said backscattered radiation in said interferometer to generate a tomographic structural image;
   processing said inphase and quadrature signals corresponding to said interference fringes established by said backscattered radiation in said interferometer using an autocorrelation based method to obtain the mean backscattered frequency;
   processing said backscattered frequencies to generate image showing velocity information; and
   processing said velocity image and said tomographic structural image to generate a combined image and displaying said combined image.

2. The method of claim 1 where scanning said fluid flow sample with a source of at least partially coherent optical radiation comprises scanning said fluid flow sample with a source of low coherence radiation.

3. The method according to claim 1 including transmitting the radiation from the source of at least partially coherent optical radiation to said fluid flow sample along a plurality of optical fibers.

4. The method as claimed in claim 1, which includes providing radiation from a plurality of separate sources of at least partially coherent optical radiation sources and transmitting the radiation to said flow sample along a plurality of optical waveguide wafers.

5. The method according to claim 1 wherein scanning said fluid flow sample comprises scanning said fluid flow sample with said source of at least partially coherent optical radiation through a fiberoptic Michelson interferometer.

6. The method according to claim 1 wherein said interferometer has a reference beam and a sample beam and wherein scanning said fluid flow sample with said source of radiation through said interferometer further comprises matching polarity and equalize optical path length differences of said reference and said sample beams to optimize fringe contrast in said interferometer.

7. The method according to claim 1 including
   a) providing a rotatable mirror in the first optical path;
   b) deflecting the first optical path,
   c) causing a plurality of focal points to be located on a surface within the first optical path;
   d) performing an axial scan;
   e) performing one of:
      rotating the mirror to move said surface;
      linearly translating, in combination, the focusing means, focusing optical radiation from the optical radiation sources into a plurality of respective focal points located on a surface within the first optical path to provide substantially continuous coverage of a selected portion of the first optical path, in combination, the focusing means the plurality of optical radiation sources and the mirror to move the surface; and, simultaneously rotating the mirror and linearly translating, in combination, the focusing means, the plurality of optical radiation sources and the mirror to move the surface; and f) repeating step (d) at least two times and performing step e) between each repetition.

8. A method as claimed in claim 7, wherein there is a change in refractive index between a medium containing the source of at least partially coherent optical radiation and the fluid flow sample, wherein for each focal point, a distance mismatch due to a change in refractive index between the coherence gate of each source of at least partially coherent optical radiation and the focal point in the sample is obtained according to the steps of:

a) scanning optical radiation from the plurality of optical radiation sources in said first optical path such that the focal points of the optical radiation sources are aligned along a path extending from the medium containing the optical radiation sources into the sample;

b) detecting the reflected optical radiation for each focal point; and c) locating the focal point for which there is a large change in reflected optical radiation compared to neighboring focal points, wherein, the focal point located in step (c) indicates the location of the interface between the sample and the medium containing the optical radiation sources.

9. An apparatus for optical Doppler tomographic imaging of fluid flow velocity in highly scattering medium, comprising:

a source of at least partially coherent optical radiation;

an interferometer coupled to said source of radiation, said interferometer having a reference arm for a reference beam and a sample arm for a sample beam;

a scanner coupled to said interferometer for scanning a fluid flow sample with said sample beam of said interferometer;

a sensor coupled to said interferometer for detecting backscattered radiation received by said interferometer from said scanner to detect interference fringes within said interferometer; and signal demodulation means coupled to said sensor for generation of inphase and quadrature components corresponding to said interference fringes; and data processor coupled to said demodulation means for processing said inphase and quadrature signals corresponding to said interference fringes established by said backscattered radiation in said interferometer for controlling said scanner to generate tomographic images, wherein said data processor is configured to generate a tomographic structural image and a flow velocity image through an autocorrelation based method for estimation of mean backscattered frequency, and processing said velocity image and said tomographic structural image to generate a combined image; and display means for displaying said combined image.

10. The apparatus according to claim 9 wherein the data processor is configured to process said inphase and quadrature signals corresponding to said interference fringes established by said backscattered radiation in said interferometer to generate a tomographic structural image;

process said inphase and quadrature signals corresponding to said interference fringes established by said backscattered radiation in said interferometer using an autocorrelation based method to obtain the mean backscattered frequency;

process said backscattered frequencies to generate image showing velocity information; and process said velocity image and said tomographic structural image to generate a combined image.

11. The apparatus according to claim 9 including a plurality of optical fibers optically coupled to said source of at least partially coherent optical radiation and said flow sample for transmitting the optical radiation to said flow sample.

12. The apparatus according to claim 9 wherein said source of at least partially coherent optical radiation is a plurality of separate non-coherent optical radiation sources and transmitting the optical radiation to said flow sample along a plurality of optical waveguide wafers.

13. The apparatus according to claim 9 wherein the source of at least partially coherent optical radiation is a plurality of at least partially coherent optical sources, optically coupled to the flow sample using a plurality of optical fibers or a plurality of optical waveguide wafers and including a plurality of optical couplers to adjust an intensity of the optical radiation in each of the plurality of optical fibers or the plurality of optical waveguide wafers for facilitating deep or shallow scanning.

14. The apparatus according to claim 9 which includes supplying radiation from the source of at least partially coherent radiation through a plurality of optical couplers to a plurality of optical fibers, providing a rapid scanning optical delay generator connected to the optical couplers and providing a second optical path, permitting radiation to be transmitted back along the first and second optical paths to the optical couplers, for forming interference, and transmitting optical radiation received from the first and second optical paths at the optical couplers to detection means for detection of the interference pattern.

15. The apparatus according to claim 9 wherein said source of at least partially coherent radiation is a plurality of sources of at least partially coherent radiation sources and, for each source of partially coherent radiation, a respective tree coupler, and coupling each source of at least partially coherent radiation through said respective tree coupler to each of the optical couplers.

16. The apparatus according to claim 13 including an optical circulator means between the optical couplers and the detection means for providing salvaged optical radiation to the detection means.

* * * * *

UNITED STATES PATENT AND TRADEMARK OFFICE
CERTIFICATE OF CORRECTION

PATENT NO.      : 7,894,046 B2
APPLICATION NO. : 12/318754
DATED           : February 22, 2011
INVENTOR(S)     : Morofke et al.

It is certified that error appears in the above-identified patent and that said Letters Patent is hereby corrected as shown below:

On the title page item (76),

Please correct the spelling of inventor Victor Tang's last name as indicated below:

Victor "Yang"

Signed and Sealed this
Seventh Day of June, 2011

David J. Kappos
*Director of the United States Patent and Trademark Office*